United States Patent [19]

Fierle

[11] Patent Number: 5,713,411
[45] Date of Patent: Feb. 3, 1998

[54] MEANS FOR LIFTING HEAT TRANSFER ELEMENT BASKETS

[75] Inventor: Kurt M. Fierle, Wellsville, N.Y.

[73] Assignee: ABB Air Preheater, Inc., Wellsville, N.Y.

[21] Appl. No.: 764,533

[22] Filed: Dec. 12, 1996

[51] Int. Cl.$^6$ .................................. F23L 15/02
[52] U.S. Cl. ........................ 165/8; 165/10; 165/76
[58] Field of Search ............................. 165/6, 7, 8, 10, 165/DIG. 43

[56] References Cited

U.S. PATENT DOCUMENTS

| | | | |
|---|---|---|---|
| 4,552,204 | 11/1985 | Bellows | 165/10 |
| 4,789,024 | 12/1988 | Muscato | 165/10 |
| 5,454,418 | 10/1995 | Bropht et al. | 165/8 |

Primary Examiner—Henry A. Bennett
Assistant Examiner—Pamela A. O'Connor
Attorney, Agent, or Firm—Alix, Yale & Ristas, LLP

[57] ABSTRACT

A lifting device for engaging lifting openings in a splitter plate of a heat transfer element basket assembly has first and second opposed hook bodies. Each hook body has an upper engagement portion and a lower portion offset from the upper portion. The hook bodies further define hook openings. A fastener releasably fastens the upper portions of the hook bodies wherein the hook openings define a through-bore and the lower portions define a splitter plate gap. Each hook body further defines a hook portion extending from the offset portion forward the other hook body and across the splitter plate gap. The hook portions are adapted to extend through the lifting openings of the splitter plate when the hook bodies are fastened by the fastener.

8 Claims, 4 Drawing Sheets

MEANS FOR LIFTING HEAT TRANSFER ELEMENT BASKETS

FIELD OF THE INVENTION

This invention relates to the field of regenerative air preheaters for use with a furnace. More particularly, this invention relates to a device for the lifting of baskets having heat transfer elements into and out of such air preheaters.

BACKGROUND OF THE INVENTION

Conventional rotary regenerative air preheaters are commonly employed to transfer heat from the flue gases exiting a furnace to the incoming combustion air. Rotary regenerative preheaters have a rotor rotatably mounted in a casing or housing. The rotor supports heat transfer surfaces defined by heat transfer elements for the transfer of heat from the flue gases to the incoming combustion air.

The rotor has radial partitions or diaphragms defining compartments therebetween. Heat transfer element basket assemblies are mounted into the sector shaped compartments. Each heat transfer element basket assembly supports stacked heat transfer plates for the absorption of heat from a hot flue gas stream extinguish the furnace.

Ducts mounted to the casing direct a flue gas stream and a combustion air stream over the continuously rotating rotor. Sector plates positioned adjacent the upper and lower faces of the rotor divide the preheater into an air side and a flue gas side. The heat transfer elements absorb heat from the flue gas stream on the flue gas side of the preheater. The heat transfer elements are then rotated to the air sector of the air preheater. The combustion air stream directed over the heat transfer elements is thereby heated.

Typically, a heat transfer element basket assembly supports the heat transfer elements in a frame work having end plates. The heat transfer element basket assembly also include a stiffening member referred to as a splitter plate. The splitter plate is disposed parallel to the heat transfer plates and located approximately midway between the inner and outer end plates of the basket assembly. The splitter plate ties together the structural members of the basket assembly and increases the structural integrity of the frame of the basket assembly. The splitter plate may include lifting holes along the upper and lower edges to provide for the insertion of lifting hooks.

Heat transfer element basket assemblies are typically lifted into or out of the compartments of the air preheater rotor by a crane or other lifting apparatus. Due to erosion and corrosion, the basket assemblies will be typically replaced multiple times during the operational life of an air preheater. The cold end heat transfer elements are typically subject to the highest amount of corrosion. In order to extend the operational life of the heat transfer elements, the basket assembly for use at the cold end of the rotor are preferably removed, reversed and repositioned back into the rotor.

Employing solely openings in the splitter plate to allow lifting of the heat transfer element basket assembly from the rotor by a lifting hook has several disadvantages. It is possible for the lifting hooks to disengage from the splitter plate in high wind conditions or with a crane malfunction. Furthermore, in order to provide sufficient space for the insertion and removal of a lifting hook from openings in the splitter plate, the splitter plate must extend both above and below the edges of the heat transfer plates such that the openings will be accessible. This extension of the splitter plate above and below the edges of the heat transfer plates can lead to an undesirable empty or dead space within the heat exchanger in the axial spaces between the stacks of basket assemblies. These empty spaces increase the overall height of the heat exchanger.

Therefore, it is preferable to employ heat transfer element basket assemblies wherein the splitter plate is even or flush with the top and bottom edges of the heat transfer elements. In order to provide accessible lifting holes for flush or what are typically referred to as low profile splitter plates, extender tabs containing lifting holes can be affixed to the upper edge of the splitter plate for extension above the plane of the heat transfer elements. However, once the basket assembly is positioned into the rotor, the extender tabs are cut off, therefore, resulting in the lifting holes being unavailable for later repositioning or replacement of the basket assembly.

SUMMARY OF THE INVENTION

Briefly stated, the present invention is a positive locking heat transfer element basket assembly lifting device. The lifting device is readily affixed to and removed from the splitter plate of a basket assembly. The lifting device has particular utility with low profile basket assemblies having splitter plates flush with the heat transfer elements.

The lifting device in accordance with the invention has a pair of oppositely positioned hook bodies for engagement to the splitter plate of a heat transfer element basket assembly. Each hook body has an upper engagement portion for engagement to the oppositely positioned hook body. The upper engagement portions extend above the upper edge of the splitter plate and together define a through-bore to which a lifting hook or other lifting device can be affixed.

A lower offset portion extends from the upper engagement portion of each hook body. The lower offset portions are transversely offset from the upper engagement portions in opposite directions from each other. The lower offset portions extends downward along the opposite surfaces of the splitter plate. A hook portion extends transversely from each lower portion of each hook body in an opposite direction of the offset of the lower offset portion relative to the upper engagement portion. The hook portions engage lifting openings formed in the splitter plate. A releasable fastener, such as a threaded bolt, extends through aligned fastener openings in the oppositely positioned hook bodies for rapid and simplified installation and removal of the lifting device from the splitter plate of the basket assembly.

An object of the invention is to provide a lifting device readily engageable and disengagable from the splitter plate of a heat transfer element basket assembly.

Another object of the invention is to provide a lifting device that positively locks onto the splitter plate of a heat transfer element basket assembly wherein relative motion between the lifting device and the splitter plate is reduced.

A further object of the invention is to provide a lifting device having improved lifting characteristics for use in high wind and other adverse conditions.

These and other objects of the invention will be apparent from the specification and drawings.

DESCRIPTION OF THE PREFERRED EMBODIMENT

Figure 1:
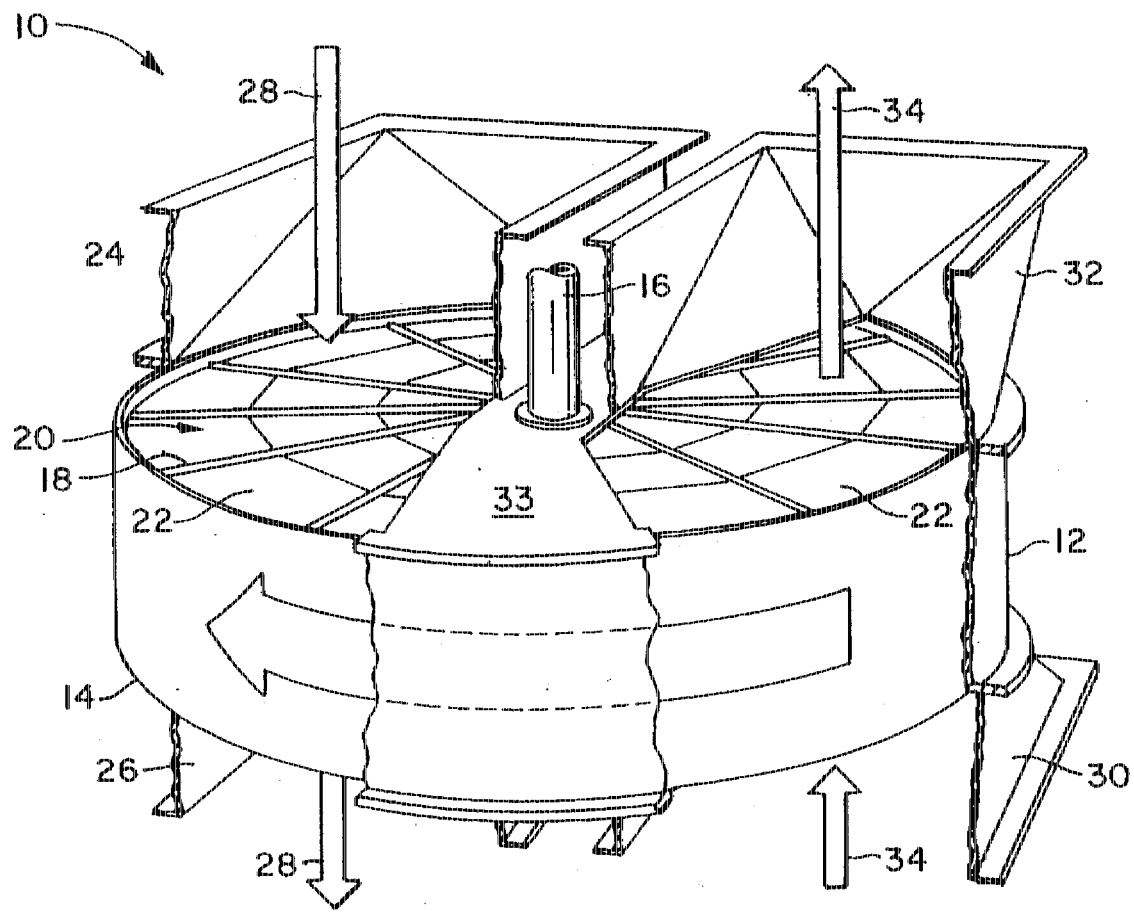
FIG. 1 is a perspective view, partially broken away, of a rotary regenerative preheater for which the present invention can be employed.

A conventional rotary regenerative preheater is generally designated by the numerical identifier 10. (See FIGS. 1 and 2) The rotary regenerative preheater 10 has a casing 12. Rotatably mounted within the casing 12 is a rotor 14. The rotor 14 has a shaft or rotor post 16 to support the rotor for rotation within the casing 12. Dividers or diaphragms 18 extend radially from the rotor post 16 to define compartments 20 therebetween. Mounted in the compartments are generally sector shaped heat transfer element basket assemblies 22. The basket assemblies 22 support stacks of heat transfer elements 36 for the absorption and release of heat energy. Attached to the casing 12 are a flue gas inlet duct 24 and a flue gas outlet duct 26 for the flow of a heated flue gas stream, generally shown by the arrows 28, through the preheater 10.

The preheater 10 further has an air inlet duct 30 and an air outlet duct 32 for the flow of combustion air, generally indicated by the arrows 34. Sector plates 33 extend across the casing adjacent the upper and lower faces of the rotor 14 to define an air side and a flue gas side of the preheater 10. Hot flue gas entering the flue gas side through the flue gas inlet duct 24 transfers heat to the heat transfer elements 36 supported in the basket assemblies 22 on the continuously rotating rotor 14. The heated heat transfer elements 36 within the basket assemblies 22 are then rotated to the air side of the preheater 10. The stored heat of the heat transfer elements 36 is then transferred to the combustion air stream entering through the air inlet duct 30. The cooled flue gases exit the preheater 10 through the flue gas outlet duct 26, and the heated combustion air exits the preheater 10 through the air outlet duct 32.

The basket assemblies 22 are generally formed in a sector or wedge shape and support pluralities of stacked heat transfer elements 36. The heat transfer elements 36 are arranged vertically within the basket assembly 22 and, therefore, within the preheater 10. The basket assembly 22 further has end plates 38, 40 and structural supports 42 extending between the end plates 38, 40 to support the heat transfer plates 36. A splitter plate 44 having an upper edge portion 46 and a lower edge portion 48 is arranged parallel to and has the same vertical orientation as the heat transfer plates 36. The splitter plate 44 provides additional structural support to the basket assembly 22 and provides a structural member for which to lift the basket assembly 22 for positioning into and removal from the compartments of the rotor 14.

Figure 2:
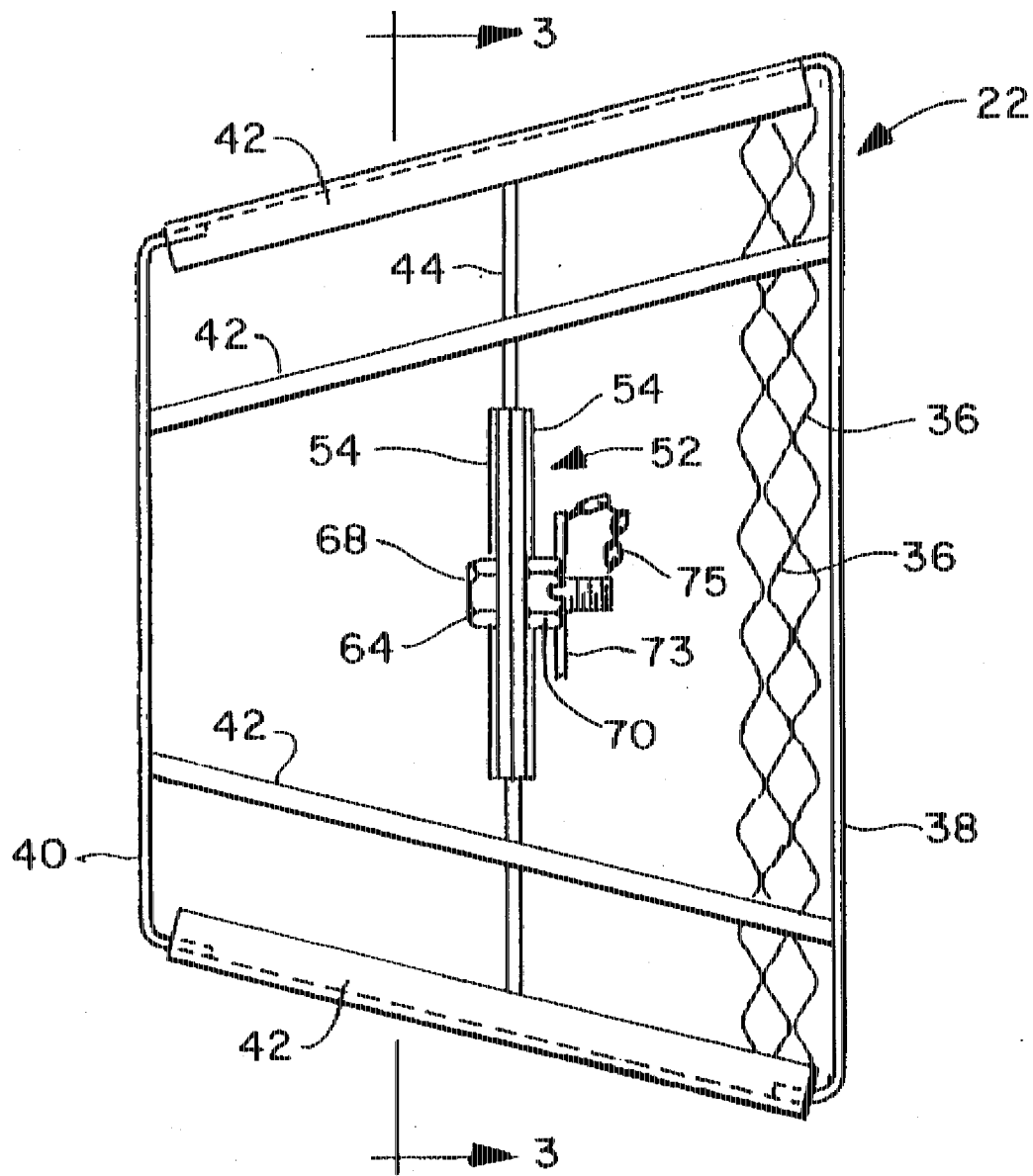
FIG. 2 is an end view, partially in phantom, of a low profile heat transfer element basket assembly having a lifting device in accordance with the invention.

In a conventional low profile heat transfer element basket assembly 22 as shown in FIG. 2, the upper edge portion 46 and the lower edge portion 48 of the splitter plate 44 are generally flush with the upper and lower edges of the heat transfer elements 36. The flush arrangement of the upper and lower edge portions 46, 48 of the splitter plate 44 with the edges of the heat transfer elements 36 reduces the vertical spacing between the stacks of heat transfer element basket assemblies 22 within the rotor 14. Therefore, the rotor 14 can have a more compact arrangement for a given amount of heat transfer capacity. The upper edge portion 46 and lower edge portion 48 of the splitter plate 44 define a pair of lifting device engagement openings 50. The lifting openings 50 are preferably provided in both the upper edge portion 46 and the lower edge portion 48 in order to allow the heat transfer element basket assembly 22 to be installed in the rotor 14 in oppositely rotated orientations. The reversal of the basket assemblies 22 extends the operational life of the heat transfer elements 36. This is particularly important for heat transfer elements 36 employed in the cold end of the preheater 10 where the most significant corrosion occurs.

Figure 3:
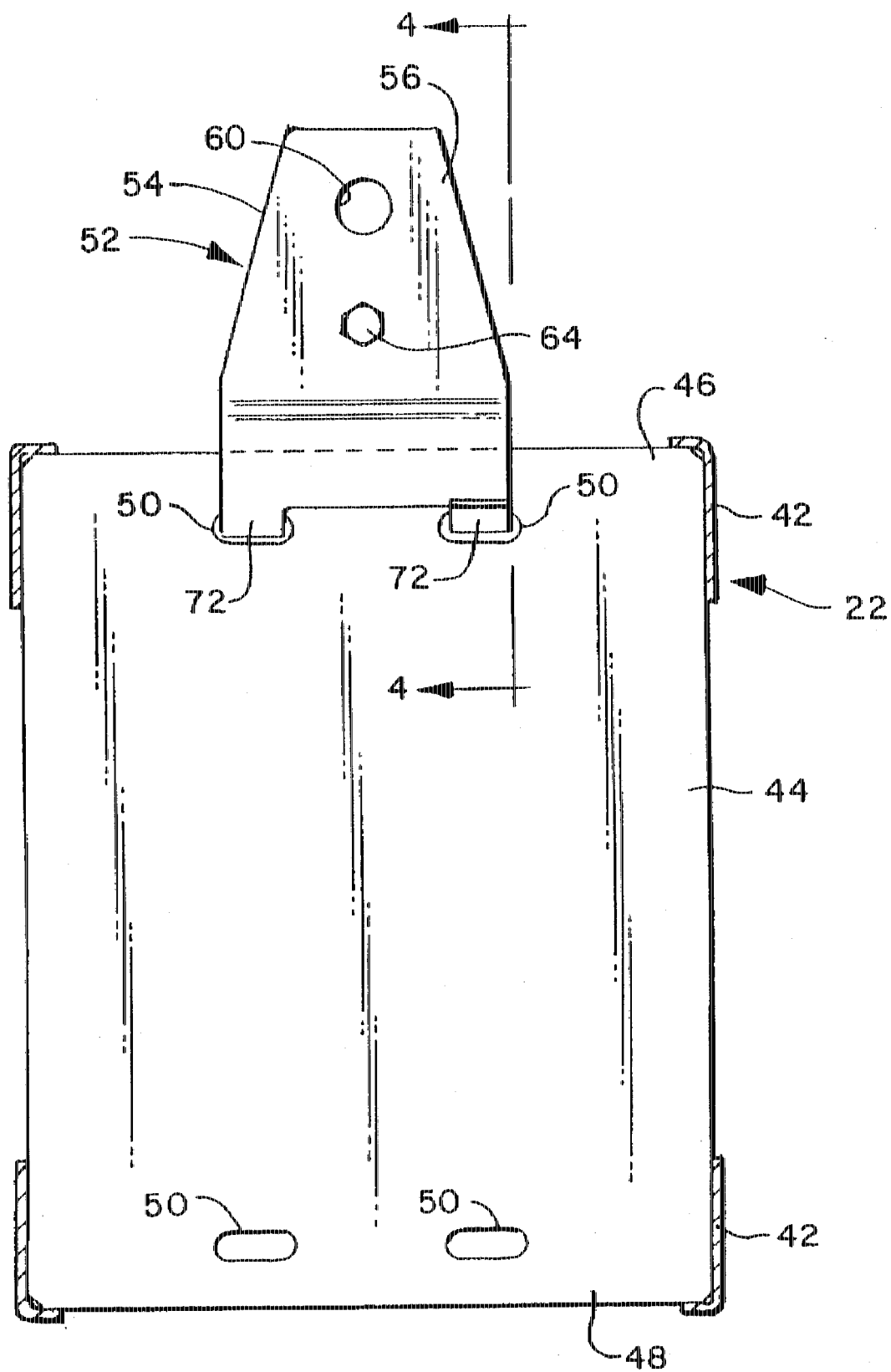
FIG. 3 is a cross sectional view, partially in phantom, of the heat transfer element basket assembly and lifting device of FIG. 2 taken along the line 3—3.
Figure 4:
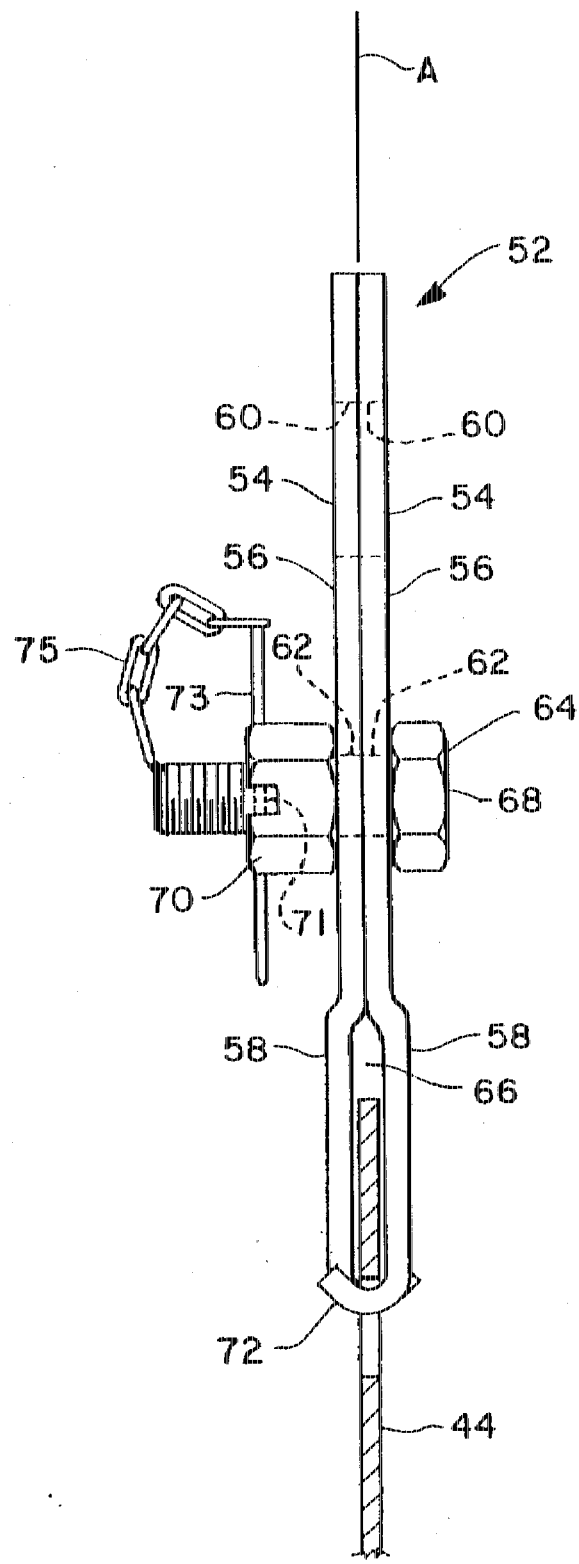
FIG. 4 is a cross sectional view, partially in phantom, taken along the line 4—4 of the lifting device of FIG. 3.

A lifting device 52 in accordance with the invention engages the lifting openings 50 for the lifting of the basket assembly 22. (See FIGS. 3 and 4) The lifting device 52 has oppositely positioned engaged hook bodies 54 when installed to the splitter plate 44. Each hook body 54 has an upper engagement portion 56 and a lower offset portion 58. Both the upper engagement portions 56 and lower offset portions 58 are preferably generally planar. The upper engagement portion 56 of each hook body 54 defines a lifting hook opening 60 and a fastener opening 62. The lifting hook opening 60 and fastener opening 62 of each hook body 54 define continuous through-bores when the hook bodies 54 are in alignment. A lifting hook (not shown) can be inserted through the aligned lifting hook openings 60 for lifting of the basket assembly 22.

A releasable fastener 64, such as a threaded bolt 68 and nut 70, can be readily inserted into the fastener opening 62 for securing the engagement portions 56 of oppositely positioned hook bodies 54 together. The nut 70 is preferably slotted and the shank of the bolt 68 defines a pin through-bore 71. The nut 70 can thereby be tightened onto the bolt 68 to hold the hook bodies 54 in engagement and a pin 73 inserted through the slots of the nut 70 and into the pin bore 71 to prevent loosening of the nut 70 during a lifting procedure. A cotter pin or other device to prevent rotation of the nut 70 can be substituted for the pin 73. A keeper chain 75 fixed between the end of the shank of the bolt 68 and the pin 73 prevents loss of the pin 73. The keeper chain 75 further preferably prevents complete removal of the nut 70 from the bolt 68 thereby maintaining the lifting device 52 as a single assembly. The shank of the bolt 68 is sufficiently extended to allow attachment or removal of the lifting device 52 from the splitter plate 44 without requiring removing the nut 70 from the bolt 68.

The hook bodies 54 together define a longitudinal axis A. The lower offset portions 58 are offset transversely from the axis A to define a splitter plate gap 66 therebetween. The splitter plate gap 66 is preferably generally equivalent to the width of the splitter plate 44, thereby resulting in surface to surface contact between each lower offset portion 58 and the side surfaces of the splitter plate 44 at the upper or lower edge portions 46, 48.

A hook portion 72 extends from each lower offset portion 58 of the lifting device 52. The hook portions 72 extend transversely in the direction opposite the direction of the offset of the lower offset portions 58 from which each hook portion 72 extends. In other words, each hook portion extends transversely toward the opposite hook body 54. The hook portions 72 extend transversely through the lifting openings 50 formed in the splitter plate 44. Each hook body 54 defines preferably a single hook for extension through only one of the pair of lifting openings 50. The hook portions 72 of the opposite hook bodies 54 extend in opposite transverse directions to therefore positively lock the lifting device 52 on the splitter plate 44 and prevent removal of the lifting device 52 without removal of the fastener 64. The hook portions 72 preferably extend completely through the lifting openings 50 to the opposite side of the splitter plate 44 to result in the hook portions 72 engaging the entire width of the splitter plate 44.

The pair of hook bodies 54 to form a lifting device 52 are preferably identical for reduced manufacturing cost and simplified installation. The hook bodies 54 can therefore be readily installed from either side of the splitter plate 44. In addition, each hook body 54 is preferably formed as a singular component for increased strength and reduced manufacturing costs.

During installation of the lifting device 52, the nut 70 is fully extended on the bolt 68 and one hook body 54 is positioned on each opposite side of the splitter plate 44. The generally narrow profile of the preferably planar hook bodies 54 allows the hook bodies 54 to be inserted down between the splitter plate 44 and the adjacent heat transfer elements 36. The hook portion 72 of each hook body 54 is next inserted through one of the lift openings 50. The lift hook openings 60 are then brought into alignment between the two hook bodies 54 to define a co-linear bore. The fastener 64, can then be rapidly and readily tightened to positively lock the lifting device 52 onto the splitter plate 44. The pin 73 can then be inserted into the pin bore 71 to prevent release of the lifting device 52 from the splitter plate 44 during the lifting operation. The positive lock of the lifting device 52 on the splitter plate 44 prevents disengagement of the lifting device in high wind conditions or during a crane malfunction. The lifting device 52 cannot be disengaged until the fastener 64 is released.

While a preferred embodiment of the present invention has been illustrated and described in detail, it should be readily appreciated that many modifications and changes thereto are within the ability of those of ordinary skill in the art. Therefore, the appended claims are intended to cover any and all of such modifications which fall within the true spirit and scope of the invention.

I claim:

1. A lifting device for engaging the splitter plate of a heat transfer element basket assembly having lifting openings therethrough comprising:

a first hook body having an upper engagement portion defining a lifting hook opening, and a lower portion offset from said upper portion;

a second hook body having an upper engagement portion for engagement to said upper engagement portion of said first hook body and defining a lifting hook opening and a lower offset portion offset from said upper portion;

fastener means for releasably fastening said engagement portions of said first and second hook bodies wherein said lifting hook openings of said first and second hook bodies define a through-bore and said offset portions of said first and second hook bodies define a splitter plate gap therebetween;

each said hook body further having a hook portion extending from said offset portion toward the other of said hook bodies and extending across said splitter plate gap when said hook bodies are fastened by said fastener means to extend through said lifting openings.

2. The lifting device of claim 1 wherein said fastener means comprises a threaded bolt and nut.

3. The lifting device of claim 2 further comprising a pin and wherein said bolt defines a pin through-bore for receiving said pin.

4. The lifting device of claim 3 further comprising a chain fixed to said bolt and said pin.

5. The lifting device of claim 1 wherein said fastener means comprises a fastener opening defined by said engagement portions, and a releasable fastener extending through said fastener opening.

6. The lifting device of claim 5 wherein said fastener comprises a threaded bolt and nut.

7. The lifting device of claim 1 wherein said hook bodies are generally planar.

8. The lifting device of claim 1 wherein said first and second hook bodies define the same shape.

* * * * *